Figure 1:
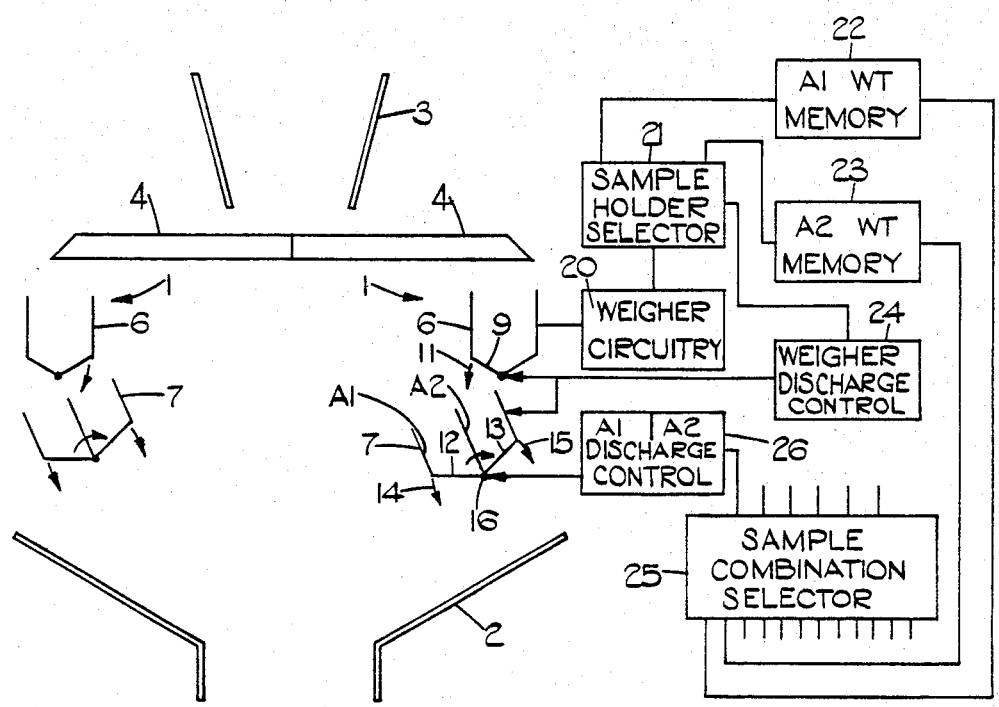

United States Patent [19]

Steel

[11] Patent Number: 4,534,430
[45] Date of Patent: Aug. 13, 1985

[54] COMBINATION WEIGHING MACHINES AND METHOD

[76] Inventor: Henry J. Steel, Malvern, England

[21] Appl. No.: 562,514

[22] Filed: Dec. 19, 1983

[30] Foreign Application Priority Data

Dec. 17, 1982 [GB] United Kingdom ............... 8236007

[51] Int. Cl.³ .................... G01G 13/22; G01G 19/22; G01G 19/52
[52] U.S. Cl. ...................................... 177/25; 177/50; 177/91
[58] Field of Search ................. 177/25, 50, 210 C, 91, 177/92, 93, 94, DIG. 12

[56] References Cited

U.S. PATENT DOCUMENTS

| | | | |
|---|---|---|---|
| 998,106 | 7/1911 | Maher | 177/94 |
| 3,404,742 | 10/1968 | Bonneric | 177/92 |
| 4,366,875 | 1/1983 | Dauge et al. | 177/210 C |
| 4,418,771 | 12/1983 | Henry et al. | 177/25 X |
| 4,437,527 | 3/1984 | Omae et al. | 177/25 |
| 4,446,938 | 5/1984 | Kawanishi | 177/25 |
| 4,484,645 | 11/1984 | Inoue | 177/50 X |

Primary Examiner—Thomas H. Tarcza
Assistant Examiner—Patrick W. Foster
Attorney, Agent, or Firm—Young & Thompson

[57] ABSTRACT

The machine comprises one or more weighers for producing electrical output signals dependent on the weights of samples weighed thereby, and a plurality of sample holders, greater in number than the weighers, for holding respective samples. The sample holders may include a respective weigher holder associated with each weigher, and two or more storage holders associated with each weigher for holding samples discharged from the associated weigher holder. The machine further comprises memories for storing signals indicative of the weights of the samples in the storage holders as determined by the weighers, and selection circuitry for making a selection from amongst the samples in all the storage holders in dependence on the weights of the samples as indicated by the memories and for discharging the selected samples from the storage holders to form a batch of an appropriate weight.

20 Claims, 2 Drawing Figures

COMBINATION WEIGHING MACHINES AND METHOD

This invention relates to combination weighing machines and to methods of combination weighing.

In making up batched quantities of products of inherently variable piece weight, such as sweets or potatoes, it is essential that the total weight of each batch should not be less than a declared weight. If the batches are made up by normal single batch weighing methods, this will result in batch weights in a range extending above the declared weight to a maximum value dependent on the extent to which the piece weight varies. The purpose of combination weighing is to reduce the range over which the batch weights are spread so that these weights approximate more closely to the declared weight. This is done by weighing a number of previously prepared samples each comprising one or more pieces and approximating in weight to a fraction ($\frac{1}{2}$, $\frac{1}{3}$, etc.) of the desired batch weight. A selection is then made from the available sample weights such that the selected sample weights, when combined together, come closest to or within acceptable limits of the declared weight, and the selected samples are then brought together to form a batch.

U.K. Patent Specification No. 2,074,329A describes a combination weighing machine which operates on the above principle and which comprises ten weighers arranged around a central chute. Samples of variable weight are supplied to the weighers, and electrical output signals proportional to the measured weights are supplied to selection circuitry which makes an appropriate selection from amongst the ten sample weights, the selected samples then being discharged to the central chute to form a batch. Subject to there being sufficient samples remaining in the weighers from which an appropriate selection may be made, this process is then repeated to produce a further batch. When insufficient samples remain in the weighers, fresh samples are supplied to the weighers from which samples have previously been discharged, prior to the selection process being repeated.

Clearly the range over which the batch weights produced by such a machine are spread is dependent on the number of weighers provided. Generally, assuming a statistically normal distribution of sample weights, the greater the number of weighers provided, the smaller the range of batch weights produced as the selection may be made from a larger number of sample weights. However, in practice, a limit is placed on the number of weighers employed in such machines, and hence on the accuracy of the machines, due to the high cost of the weighers. Furthermore there will be a tendency for some of the weighers to become filled with samples which are of such a weight that they are only likely to be required infrequently to make up a batch, and this will reduce the rate of production since the other weighers will have to be frequently emptied and refilled.

It is an object of the invention to improve the production rate per weigher and/or to enable a certain level of accuracy to be achieved using a smaller number of weighers.

According to the invention a combination weighing machine comprises one or more weighers for producing electrical output signals dependent on the weights of samples weighed thereby, a plurality of sample holders, greater in number than the weighers, for holding respective samples, memory means for storing signals indicative of the weights of the samples in the sample holders as determined by the weigher(s), and selection means for making a selection from amongst the samples in all the sample holders in dependence on the weights of the samples as indicated by the memory means and for discharging the selected samples from the sample holders to form a batch of an appropriate weight.

It will be appreciated that the accuracy of such a combination weighing machine will be dependent on the number of sample holders provided, and that the number of weighers used may therefore be decreased by comparison with the previously described machine without affecting either the accuracy or the production rate.

The sample holders may consist of a respective weigher holder associated with the or each weigher for holding samples whilst they are being weighed by the weigher, and one or more storage holders for receiving weighed samples from one or more weigher holders and for holding the samples until they are selected and discharged. In this case samples will be selected and discharged both from the storage holder(s) and directly from the weigher holder(s) in order to make up the batches.

However, in a preferred embodiment, the sample holders consist of a plurality of storage holders, greater in number than the weighers, for receiving weighed samples from one or more separate weigher holders, which hold samples whilst they are being weighed, and for holding the samples until they are selected and discharged. In this case all the samples for making up the batches will be selected and discharged from the separate storage holders, and none will be discharged directly from the weigher holders.

In either of the above alternatives, the or each storage holder is preferably movable relative to an associated weigher holder so as to enable the storage holder to be moved into a position in which it can receive a sample discharged from the weigher holder and to be moved out of that position with a sample contained therein. Where samples are to be obtained directly from the or each weigher holder for making up the batches, the or each storage holder is conveniently movable into such a position as to leave a clear drop below the or each weigher holder so that samples may be discharged simultaneously from the storage holder(s) and the weigher holder(s) into a common collecting funnel. Whether or not samples are to be obtained directly from the or each weigher holder for making up the batches, two or more storage holders may be associated with the or each weigher holder, each storage holder being movable into a position in which it can receive a sample discharged from the associated weigher holder.

Each holder may have an open top through which a sample may be introduced into the holder and a bottom which may be opened to discharge a sample from the holder. In the case of the storage holders, two or more storage holders associated with the or each weigher holder may be formed by two or more compartments of a common trap having an open top through which a sample may be introduced into any one of the compartments within the trap, and a respective openable flap associated with each compartment which may be opened to discharge a sample from that compartment. Conveniently the trap is pivotable between two or more angular positions in each of which a respective one of the compartments within the trap is positioned to receive a sample discharged from the associated weigher holder.

In an alternative embodiment, the or each storage holder may be fixed in position relative to an associated weigher holder, movable guide means being associated with the or each weigher holder and being movable between a first position in which a sample discharged from the weigher holder is received in an associated storage holder and a second position in which a sample discharged from the weigher holder is not received in said storage holder. In the second position of the guide means a sample discharged from the weigher holder may be conducted into a second storage holder or may be supplied directly to a common collecting funnel whereby samples are selected and discharged from both the storage holder(s) and directly from weigher holder(s) in order to make up the batches.

The memory means preferably comprises a respective memory location for each sample holder for storing a signal indicative of whether or not the sample holder contains a sample and of the weight of any sample contained in the sample holder. Feed control means may be provided for controlling supply of fresh samples to the sample holders, in response to the signals stored in the memory means, when the sample holders become empty, and for supplying signals indicative of the weights of the fresh samples as determined by the weigher(s) to the memory means.

Figure 2:
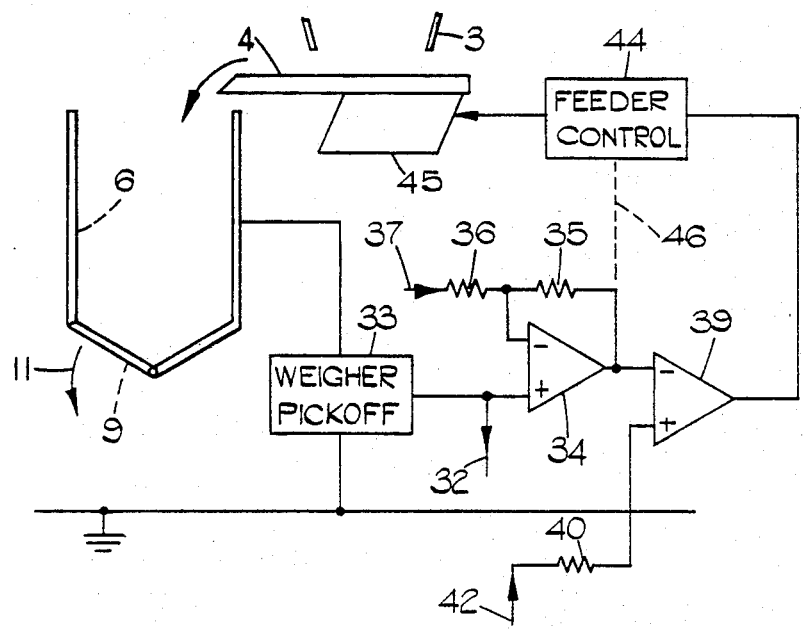

In order that the invention may be more fully understood, a combination weighing machine in accordance with the invention will now be described, by way of example, with reference to the accompanying drawing, in which:

FIG. 1 is a diagrammatic illustration of the machine with the weighing control circuitry shown in block form; and FIG. 2 is a block diagram of feed control circuitry which may optionally be used in the machine.

In the following description it will be assumed that batches are to be made up each of which comprises two product samples approximating in weight to half the desired batch weight. However, it will be appreciated that similar techniques may be used for making up batches comprising more than two samples or a number of samples which varies amongst the batches.

Referring to FIG. 1, the machine comprises six weighing units 1, only two of which are shown in the figure, arranged around a common collecting funnel 2. A hopper 3 is provided for supplying the product to be weighed to a respective feeder unit 4 for each weighing unit 1. Each weighing unit 1 comprises a weigher trap 6 arranged to receive a product sample from the associated feeder unit 4, and a holding trap 7 divided into two sample holders A1 and A2 and arranged beneath the weigher trap 6.

Each of the traps 6 and 7 is in the form of a substantially square section box having an open top and a tapered bottom. In the case of the weigher trap 6, one of the two walls forming the tapered bottom is in the form of a pivotable flap 9 which may be pivoted downwardly as shown by the arrow 11 in order to discharge a sample from the trap 6 into the trap 7 immediately beneath the flap 9. In the case of the holding traps 7, both of the walls forming the tapered bottom are formed by pivotable flaps 12 and 13 which may be pivoted downwardly in the directions shown by the arrows 14 and 15 in order to discharge samples from the sample holders A1 and A2 of the trap 7 into the collecting funnel 2. Furthermore each holding trap 7 is pivotable as a whole about a pivot axis 16 between a first angular position in which the sample holder A1 is positioned to receive a sample discharged from the associated weigher trap 6 and a second angular position in which the sample holder A2 is positioned to receive a sample discharged from the weigher trap 6.

In operation of the machine samples of variable weight approximating to half the desired batch weight are supplied to the weigher trap 6 by the feeder units 4 which are controlled by appropriate control circuitry (not shown in the FIG. 1) in order to ensure that there is a sample in each weigher trap 6 waiting to be discharged into the associated holding trap 7.

When a sample is loaded into a weigher trap 6, an electrical output signal dependent on the weight of the sample is outputted by associated weigher circuitry 20 and is stored in a selected one of a weight memory 22 associated with the sample holder A1 and a weight memory 23 associated with the sample holder A2 of the corresponding holding trap 7, the appropriate selection being made by a sample holder selector 21. The sample is then discharged into either the sample holder A1 or the sample holder A2, depending on which one of these holders A1, A2 has previously been selected by the sample holder selector 21, this operation being accomplished under control of a weigher discharge control 24 which first ensures that the holding trap is in the appropriate angular position so that the sample to be discharged will be received in the selected sample holder A1 or A2, and then opens the pivotable flap 9 to effect the discharge.

When the machine is initially run, loading of samples into the holding traps 7 by way of the weigher traps 6 is continued until both sample holders A1 and A2 of all the holding traps 7 are filled with samples. It will be appreciated that an indication of the weight of the sample in each sample holder will be stored in the associated weight memory 22 or 23. A sample combination selector 25 then computes the various combinations of the values stored in the weight memories 22 and 23 of the various weighing units 1, the values being combined two at a time, and makes an appropriate selection when a combination is obtained corresponding to a combined weight within a predetermined acceptable range. Each of the samples corresponding to the values of the selected combination is then discharged from the sample holder A1 or A2 within which it is contained into the collecting funnel 2 by opening the associated flap 14 or 15 under control of a discharge control 26. Simultaneously the memories 22 and/or 23 containing the selected values are set to zero indicating that samples are not longer contained in the associated sample holders A1 and/or A2. The samples discharged into the collecting funnel 2 are brought together to form a batch having a weight within acceptable limits which is then transported by some means to a packing machine or other destination.

A further selection is then made by the sample combination selector 25 from amongst the combinations of the weight values of the samples remaining in the holding traps 7, and further samples are discharged into the collecting funnel 2 to form a further batch. This process may be repeated as long as there is a combination within the acceptable range which can be made from the weight values of the samples remaining in the holding traps 7. However, whilst these further selections are being made and further samples are being discharged from the holding traps 7, fresh samples are transferred from the weigher traps 6 into the sample holders which are shown to be empty by zero setting of the associated memories 22 and/or 23, and appropriate weight values for the fresh samples are entered into the memories 22 and/or 23. Thus the set of weight values from which combination selections may be made by the sample combination selector 25 is continually being replenished, and batches of the required weight may be outputted from the machine continuously.

In the above description it is assumed that the weights of the samples supplied to the weigher traps 6 vary randomly about the desired value. However, the illustrated machine may also include an arrangement for controlling the weights of the samples supplied to each weigher trap 6 by the associated feeder unit 4 so as to prevent a build up of overweight or underweight samples in the sample holders, as shown in FIG. 2. In this arrangement the weight of a sample supplied to the weigher trap 6 is determined by a weigher pickoff 33 which supplies an appropriate output signal to the + input of a d.c. operational amplifier 34 and also to an analogue-to-digital converter (not shown) of the sample selection and discharge circuitry by way of an output 32. The gain of the amplifier 34 is controlled by feedback resistors 35 and 36 and an auto tare input 37 is provided for adjustment of the output of the amplifier 34 to a suitable level when the trap 6 is empty. The range of the amplifier output can be preset to suit different materials by adjusting the ratio of the feedback resistors 35 and 36.

The output of the amplifier 34 is connected to the − input of a differential voltage comparator 39 constituted by a high grain operational amplifier, the + input of this amplifier being connected to a desired weight setting circuit comprising a resistor 40 and an automatic adjustment input 42 connected to a digital-to-analogue converter (not shown). The output of the comparator 39 is supplied to a feeder control 44 which in turn controls the motor 45 of the feeder unit 4.

When the weigher trap 6 is empty, the output of the amplifier 34 is low and a potential is applied to the + input of the comparator 39 by the desired weight setting circuit so that the + input of the comparator 39 is at a higher potential than the − input, thereby driving the comparator output to a high level. This causes the feeder control 44 to start the feeder unit motor 45 so as to initiate supply of material to the weigher trap 6. As the trap 6 fills with material the potential of the output of the amplifier 34 rises. When the potential applied to the − input of the comparator 39 rises above the potential applied to the + input by the desired weight setting circuit, the comparator output falls to a low level and the feeder control 44 switches off the motor 45, thereby terminating supply of material to the trap. This cycle may be repeated once the contents of the trap 6 have been discharged by opening the pivotable flap 9.

It will be appreciated that the quantity of material which is supplied to the weigher trap 6 in a single cycle in use of such an arrangement can be controlled by applying an appropriate control signal to the automatic adjustment input 42. This control signal may be supplied by a circuit comprising a digital-to-analogue converter (not shown) having an input indicative of a refill target weight RTW for a weigher trap 6.

On initially filling the eight weigher traps 6, RTW is set to be half the desired batch weight DBW, and the eight traps 6 are then filled. The greatest weight thus produced is assigned as GW, and the samples are then discharged into the associated sample holders A1. RTW is then set to DBW−GW, and the eight traps 6 are refilled. It will be noted that this second set of eight fills is made to a target less than half DBW in order to facilitate the make up of batches of the desired weight. These samples are then discharged into the associated sample holders A2 and selection of samples to be discharged to make up batches may then begin. During this selection process values are obtained for the weight LW of the least weight sample, the number NHS of holders holding samples, and the number NLT of holders holding samples of weight less than half DBW. In subsequent cycles GW will also be computed during this process.

Thus, during subsequent refilling of the weigher traps 6, the refill target weight RTW may be automatically controlled by a feedback value FB to compensate for overweight or underweight samples in the sample holders A1 and A2. FB may be computed as as follows:

If NLT>NHS/2 then FB=(DBW/2−LW)/2
(Result positive)

If NLT=NHS/2 then FB=0

If NLT<NHS/2 then FB=DBW/2−GW (Result negative) and RTW is set to DBW/2+FB

Where NLT>NHS/2 a division by two is introduced into the calculation in order to compensate for the tendency of the feeder units 4 to produce weights greater than requested. Other correction calculations may also be used, for example a non-linear correction, and a start-up option allowing limited variation of the division factor may also be included.

Since the output of the amplifier 34 rises as the quantity of material in the trap 6 increases, this voltage can be used to control the rate of feed to the trap 6 if required, this being indicated in FIG. 2 by a broken line 46 connecting the output of the amplifier 34 to the feeder control 44. This can be used to reduce the rate of feed as the switch off point is approached with the object of increasing the accuracy of sample supply by reducing overshoot.

Although the electronic control arrangements of FIGS. 1 and 2 have been considered as comprising discrete operational components, it should be understood that, in practice, the functions of some or all of these components may be performed by a single microprocessor or a number of microprocessors corresponding to the number of weighing units.

I claim:

1. A combination weighing machine comprising feeder means for supplying feed material, a plurality of sample holders for holding respective samples of feed material supplied by the feeder means, one or more sample weighers for producing electrical output signals dependent on the weights of the samples supplied to the sample holders, memory means operatively associated with the weigher(s) for storing signals indicative of the weights of the samples in the sample holders as determined by the weigher(s), selection means connected to the memory means for making a selection from amongst the samples in the sample holders in dependence on the weights of the samples as indicated by the memory means and for discharging the selected samples from the sample holders to form a batch of a desired batch weight, and feedback control means for controlling supply of fresh feed material to the empty sample holders in dependence on the weights of the samples remaining in the sample holders as indicated by the memory means so as to supply fresh samples of target weights such as to compensate for overweight or underweight samples remaining in the sample holders.

2. A machine according to claim 1, wherein the sample holders consist of a respective weigher holder associated with the or each weigher for holding samples whilst they are being weighed by the weigher, and one or more storage holders for receiving weighed samples from one or more weigher holders and for holding the samples until they are selected and discharged.

3. A machine according to claim 1, wherein the sample holders consist of a plurality of storage holders, greater in number than the weighers, for receiving weighed samples from one or more separate weigher holders, which hold samples whilst they are being weighed, and for holding the samples until they are selected and discharged.

4. A machine according to claim 2, wherein the or each storage holder is movable relative to an associated weigher holder so as to enable the storage holder to be moved into a position in which it can receive a sample discharged from the weigher holder and to be moved out of that position with a sample contained therein.

5. A machine according to claim 2, wherein the or each storage holder is movable relative to an associated weigher holder into such a position as to leave a clear drop below the or each weigher holder so that samples may be discharged simultaneously from the storage holder(s) and the weigher holder(s) into a common collecting funnel.

6. A machine according to claim 2, wherein two or more storage holders are associated with the or each weigher holder, each storage holder being movable into a position in which it can receive a sample discharged from the associated weigher holder.

7. A machine according to claim 1, wherein each holder has an open top through which a sample may be introduced into the holder and a bottom which may be opened to discharge a sample from the holder.

8. A machine according to claim 2, wherein two or more storage holders associated with the or each weigher holder are formed by two or more compartments of a common trap having an open top through which a sample may be introduced into any one of the compartments within the trap, and a respective openable flap associated with each compartment which may be opened to discharge a sample from that compartment.

9. A machine according to claim 8, wherein the trap is pivotable between two or more angular positions in each of which a respective one of the compartments within the trap is positioned to receive a sample discharged from the associated weigher holder.

10. A machine according to claim 2, wherein the or each storage holder is fixed in position relative to an associated weigher holder, movable guide means being associated with the or each weigher holder and being movable between a first position in which a sample discharged from the weigher holder is received in an associated storage holder and a second position in which a sample discharged from the weigher holder is not received in said storage holder.

11. A machine according to claim 1, wherein the memory means comprises a respective memory location for each sample holder for storing a signal indicative of whether or not the sample holder contains a sample and of the weight of any sample contained in the sample holder.

12. A machine according to claim 3, wherein the or each storage holder is movable relative to an associated weigher holder so as to enable the storage holder to be moved into a position in which it can receive a sample discharged from the weigher holder and to be moved out of that position with a sample contained therein.

13. A machine according to claim 3, wherein two or more storage holders are associated with the or each weigher holder, each storage holder being movable into a position in which it can receive a sample discharged from the associated weigher holder.

14. A machine according to claim 3, wherein two or more storage holders associated with the or each weigher holder are formed by two or more compartments of a common trap having an open top through which a sample may be introduced into any one of the compartments within the trap, and a respective openable flap associated with each compartment which may be opened to discharge a sample from that compartment.

15. A machine according to claim 3, wherein the or each storage holder is fixed in position relative to an associated weigher holder, movable guide means being associated with the or each weigher holder and being movable between a first position in which a sample discharge from the weigher holder is received in an associated storage holder and a second position in which a sample discharge from the weigher holder is not received in said storage holder.

16. A machine according to claim 1, wherein the feedback control means is arranged to be initially set to a value to produce samples of target weights corresponding to a predetermined fraction of the desired batch weight and to subsequently vary the target weights of the samples produced by the addition of a feedback value to this initial value, the feedback value being positive if there is a preponderance of underweight samples remaining in the sample holders and being negative if there is a preponderance of overweight samples remaining in the sample holders.

17. A machine according to claim 16, wherein the feedback control means is arranged to vary the initial value by a feedback value which, when there is a preponderance of underweight samples remaining in the sample holders, is dependent on the weight of an underweight sample remaining in the sample holders.

18. A machine according to claim 16, wherein the feedback control means is arranged to vary the initial value by a feedback value which, when there is a preponderance of underweight samples remaining in the sample holders, is dependent on the weight of a least weight sample remaining in the sample holders.

19. A machine according to claim 16, wherein the feedback control means is arranged to vary the initial value by a feedback value which, when there is a preponderance of overweight samples remaining in the sample holders, is dependent on the weight of an overweight sample remaining in the sample holders.

20. A machine according to claim 16, wherein the feedback control means is arranged to vary the initial value by a feedback value which, when there is a preponderance of overweight samples remaining in the sample holders, is dependent on the weight of a greatest weight sample remaining in the sample holders.

* * * * *